United States Patent Office 3,341,746
Patented Sept. 12, 1967

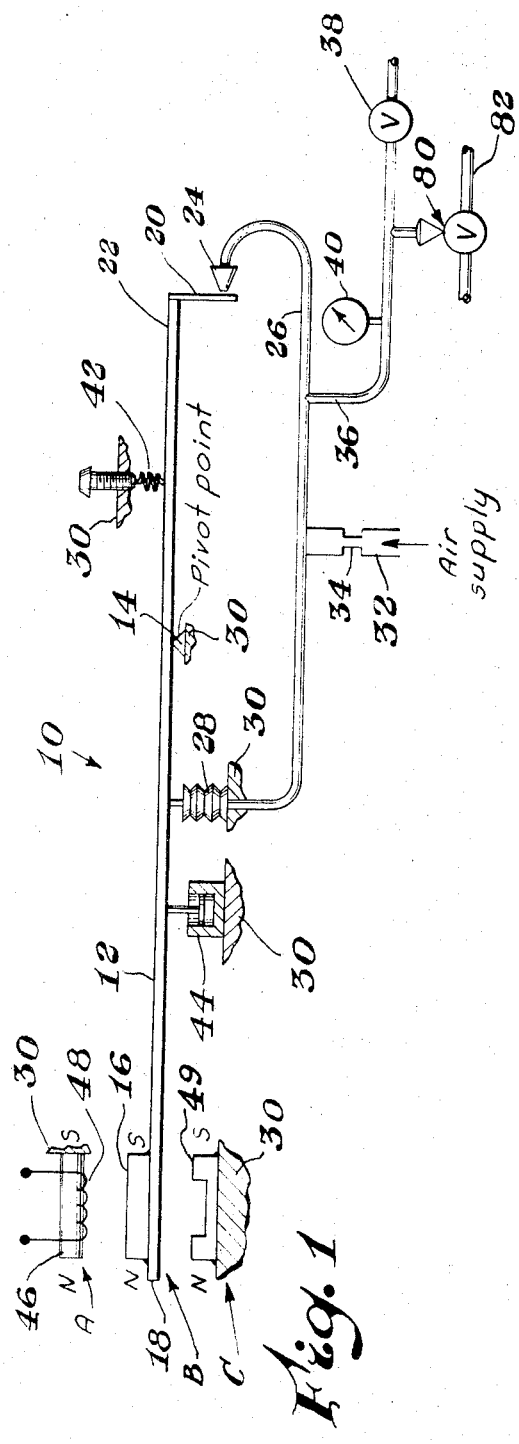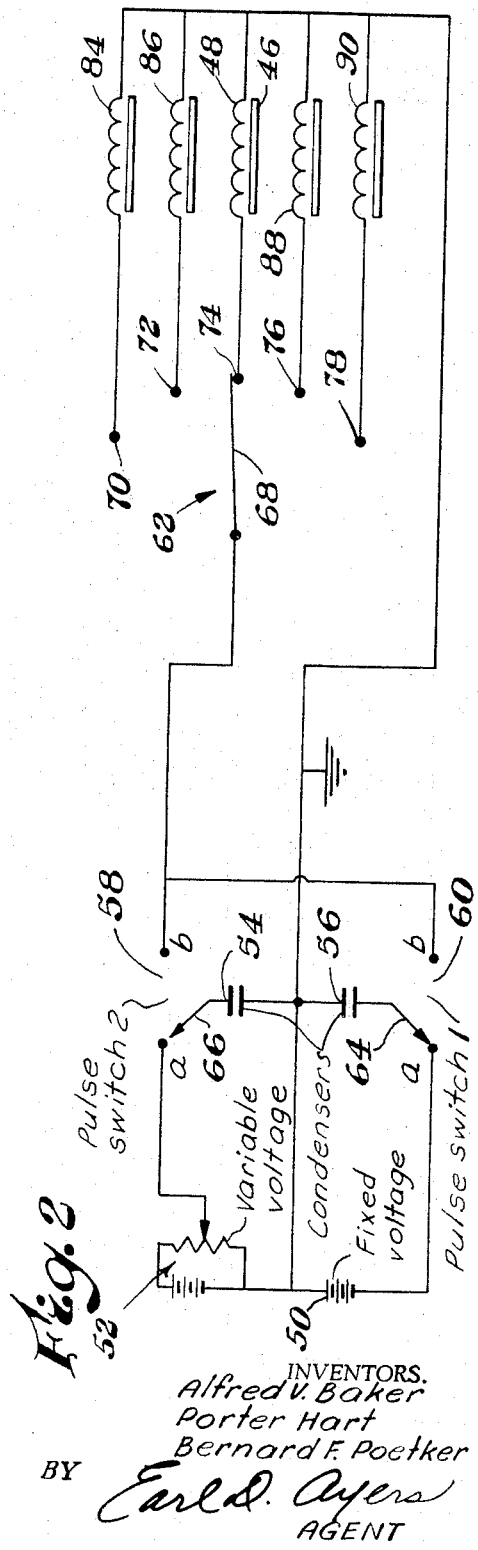

3,341,746
CONTROL METHOD AND APPARATUS
Alfred V. Baker, Freeport, Porter Hart, Lake Jackson, and Bernard F. Poetker, Huntsville, Tex., assignors to The Dow Chemical Company, Midland, Mich., a corporation of Delaware
Filed Apr. 21, 1964, Ser. No. 361,509
9 Claims. (Cl. 317—123)

ABSTRACT OF THE DISCLOSURE

This invention relates to magnetically actuated pneumatic, mechanical or electrical control devices which utilize a permanent type magnet which is capable of being driven by an electrical pulse through surrounding windings to a predetermined degree of magnetism. Centrally controlled pulsing means is coupled, usually sequentially, to the windings.

---

The permanent type magnet having windings is disposed adjacent to a balance beam which is movable in response to changes in the strength of the permanent magnet having windings.

A first pulse in the windings drives the permanent magnet to a base level, and is followed rapidly by a second pulse which sets the magnetism of the permanent magnet at a level to achieve the effect on the balance beam to achieve the then desired control function of the device.

This invention relates to a method and apparatus for actuating process control or other elements by means of intermittent signals in accordance with a desired predetermined functional relationship.

A number of approaches have been made towards controlling chemical or other manufacturing processes from a single centralized or remote location with respect to values or other elements being controlled.

Pneumatic control exercised from a central location is one approach.

In another approach a continuous electrical signal is passed through a coil coupled to a magnetizable element to provide a magnetic field of predetermined strength which is then coupled directly to a controlled element or indirectly to the control element through a pneumatic controller device.

So far as is known, the prior art systems of methods for actuating process control elements in accordance with a predetermined functional relationship suffer from one or more of the following problems:

(A) The speed at which actuating control is asserted or changed is too slow either for the process being controlled or for efficient and/or effective coupling to the means for determining the desired predetermined functional relationship;

(B) The apparatus is unduly complex with respect to the work the apparatus accomplishes;

(C) The apparatus is rather expensive with respect to the work being accomplished;

(D) The reliability of the apparatus is not as good as could be desired, resulting in substantially less than optimum process control;

(E) The stability of the control system, e.g. wherein the day to day application of the same control signal results in the same degree of valve control, for example, may be less than is desired;

(F) In event the control apparatus become inoperative, the degree of safety in further operation or shutdown of the process being controlled is less than can be tolerated;

(G) The apparatus controls the process in discrete changes in adjustment of process equipment which are larger than can be conveniently used;

(H) Each element controlled requires for its control a continuous sampling signal from the computer or other device which calculates the degree of control required, or (I) The control system is not compatible for use with existing actuating devices.

Accordingly, a principal object of this invention is to provide an improved method and apparatus for activating process control or other elements.

Another object of this invention is to provide an improved, more economical method and apparatus for actuating a plurality of process control or other elements.

A further object of this invention is to provide an improved, more economical use, method and apparatus for actuating process control or other elements.

Yet another object of this invention is to provide an improved, more reliable method and apparatus for actuating process control or other elements.

Still another object of this invention is to provide an improved, faster acting method and apparatus for actuating process control or other elements.

An ancillary object of this invention is to provide an improved, safer to use, method and apparatus for actuating process control or other elements.

A still further object of this invention is to provide an improved method and apparatus in which an intermittently applied control signal is utilized to provide substantially continuous control of process control or other elements.

An additional object of this invention is to provide an improved method and apparatus for actuating control or other elements with a great degree of resolution.

In accordance with this invention there is provided one or more magnetically actuated pneumatic, mechanical, or electrical control devices each of which utilizes a permanent type magnet which is capable of being driven to different predetermined degrees of magnetism by discrete pulses derived from centrally controlled pulsing apparatus to set the degree or level of control to be maintained. The centrally controlled pulsing apparatus is used to apply the pulses at discrete times to a selected control device.

The invention, as well as additional objects and advantages thereof, will best be understood when the following detailed description is read in connection with the accompanying drawing, in which:

FIG. 1 shows, in diagrammatical form, an assembly which converts a magnetic force into a pneumatic output; and FIG. 2 shows, in schematic form, simplified apparatus for driving, at discrete time intervals, a plurality of A type magnets, as shown in FIG. 1, to discrete levels of magnetism.

Referring to the drawings, and particularly to FIG. 1, there is shown a magnetic-pneumatic transducer device 10 coupled to a controllable valve in accordance with this invention. The device 10 includes an elongated rigid beam 12 which is pivotally mounted on a fulcrum 14. A permanent magnetic element 16 is disposed at or near one end 18 of the beam 12 and is rigidly secured to the beam.

A flapper element 20, usually in the form of a flat leaf spring, extends transversely (usually perpendicularly) from the other end 22 of the beam 12.

A nozzle 24, coupled to the pneumatic tube 26, faces the flat surface of the flapper element 20. A bellows 28, also coupled to the pneumatic tube 26, is physically coupled between the frame 30 (shown as a fragmentary element) of the device 10 and that part of the beam 12 which lies between the fulcrum 14 (also physically coupled to the frame 30) and the end 18 of the beam 12.

A source of air, indicated as the line 32, is coupled to the pneumatic tube 26 through a suitable constriction 34.

A pneumatic output line 36 is coupled between the pneumatic tube 26 and a closure device, such as a valve, for example. A readout device, such as the pressure gauge 40, for example, may also be coupled to the line 36 (or tube 26) alternatively.

A zero spring 42, whose degree of tension (or compression) is adjustable, is coupled to the upper side of the beam 12 between the fulcrum and the end 22 of the beam to compensate for any initial imbalance in the beam assembly.

A dash pot damper device 44 is coupled between the frame 30 and the beam 12 between the fulcrum and the end 18 of the beam.

A second permanent magnet 46, having a coil 48 wound around it, is disposed above the magnet 16 and so aligned with respect to the magnet 16 that the magnets 16 and 46 repel one another. The physical spacing between the magnets 16 and 46 is sufficient to permit the pivoting beam 12 to swing the flapper 20 from a position where it substantially cuts off air (or other gas) flow from the nozzle 24 to a position where the flow of air or gas from the nozzle 24 is substantially unrestricted.

The coil 48 associated with the magnet 46 which, as mentioned previously, is disposed adjacent to the magnet 16, is mounted in a fixed position with respect to the frame 30 of the device 10.

Usually a permanent magnet 49 is disposed on the side of the beam 12 opposite to the magnet 46, alternatively, a spring biasing means (not shown) may be used.

Referring now to FIG. 2, there is shown a simplified circuit which is suitable for use in energizing the coil 48 in accordance with this invention.

The circuit includes a source of fixed voltage 50, indicated as a battery, for example, a source of variable voltage 52, a pair of condensers 45, 56, a pair of single pole, double throw switches 58, 60, and a single pole, multiple throw switch 62.

The voltage source 50, has its positive terminal connected to a ground and its negative terminal connected to one throw of the single pole, double throw switch 60. The condenser 56 is connected between ground and the movable contact 64 of the switch 60.

The variable voltage source 52 has its negative terminal connected to ground and its positive terminal connected to one of the throws of the switch 58. The condenser 54 is connected between ground and the moving contact 66 of the switch 58. The second throw of each of the switches 58, 60 are connected together and to the movable contact 68 of the single pole multiple throw switch 62.

Each of the contacts or throws 70, 72, 74, 76, 78, for example, are connected to one end of a coil (48, for example) which is coupled to a permanent magnet (46, for example) of one of the magnetic-pneumatic transducer devices 10. The other end of each coil is connected to a common ground.

In operation, the desired degree of magnetization is induced in the magnet 46 by first pulsing the coil 48 to drive the magnetization to saturation in one direction as a base point (which assures that the apparatus always operates on the same side of the hysteresis curve) and then driving the magnetization in the opposite direction to the required level to perform the predetermined control function.

Using the circuit of FIG. 2, with the moving contact 68 of the switch 62 set to the throw 74, to which the coil 48 (see FIG. 1 also) is coupled, the condenser 56 is charged by moving the contact 64 to couple the condenser 56 across the source of fixed voltage 50. The contact 64 is then connected to the other throw of the switch 60, discharging the condenser 56 across the switch 62, through the coil 48, to ground.

The variable voltage source 52 is then set to the potential which will induce the requisite degree of magnetization of the magnet 46 when the coil 48 is pulsed in the opposite direction. (The variable voltage source and the fixed voltage source are polarized opposite with respect to ground.)

With the contact 66 of the switch 58 coupled with the now preset variable voltage source, the condenser 54 is charged to the level set by the voltage source 52.

The contact 66 on the switch 58 is then coupled to the other throw of that switch, discharging the condenser 54 through the switch 62 and coil 48 to the ground (with the condenser 56 disconnected from the discharge circuit). This last pulse, oppositely polarized with respect to the pulse which occurred when the condenser 56 was discharged, produces a degree of magnetization in the magnet 46 which is proportional to the level, output or amount of control to be accomplished by the transducer device 10.

The magnets 46 and 18 may be magnetized so that they repel each other, are neutral to each other, or attract each other, the resulting force exerted on the beam by the magnets 46, 16 being a function of the level and polarity of magnetization induced in the magnet 46 (assuming the magnetization of magnet 16 remains constant).

If the force caused by the interaction of the magnets 16, 46 is a repelling force, that force would tend to push the end 18 of the beam 12 in a downward direction, causing the flapper 20 to move closer to the nozzle 24, thereby reducing the air flow from the nozzle 24.

When the air flow from the nozzle 24 is thus reduced, air pressure builds up in a pneumatic tube 26, causing the bellows 28 to exert a greater force against the beam 12. Because the bellows 28 is located between the fulcrum 14 and end 18 of the beam as is the magnet 46, but under the beam rather than above the beam as is the magnet 46, the expansion of the bellows tends to force that end of the beam up again and thus move the flapper 20 away from the nozzle 24 to a point where the upward force represented by the bellows just offsets the net downward movement exerted by the magnets 46, 16.

Thus, in this instance, the air pressure necessary to balance the beam 12 is a function of the magnetic repulsion existing between the two magnets 16, 46. Conversely, if the resulting interaction between the magnets 16, 46 is an attraction, the beam movement tends to let more air escape from the nozzle 24, reducing the pressure in the bellows, resulting in a downward force.

The change in air pressure needed to balance the beam 12 also changes the operating position of the valve 80 in the process line 82 (or other element to be similarly actuated).

The transducer device 10 will, since the magnet 46 is a memory element, maintain the valve 80 at its new operating position until the degree of magnetization of the coil 48 is changed. The moving contact 68 of switch 62 may be moved to connect magnet coils 84, 86, 88, 90, for example, of other permanent magnets (as magnet 46, for example) of other devices like the device 10, for example, to the pulsing equipment (the voltage sources 50, 52 and their associated condenser 56, 54 in simple form).

Thus, either in sequence or in random order, the other transducer devices corresponding to the transducer devices 10 may be set to provide a predetermined positional or other operating control over a process element.

While the invention thus far has been described in connection with apparatus wherein the desired pulsing of the coil 48 to achieve a predetermined level of magnetization of the magnet 46, for example, has been manually accomplished, it will be obvious to those skilled in the art, that, with the use of more sophisticated circuitry, this method of process or other control may be used in conjunction with the output of a digital computer.

The magnet 46 acts as a memory element for the device 10, as previously mentioned, keeping the actuator at a predetermined point or condition of operation until the degree of magnetism in the magnet is changed by further pulsing of the coil 48 coupled to that magnet.

The time interval between the pulsing of the coil by the apparatus shown in FIG. 2 (or by more sophisticated circuitry performing a similar function) to achieve the desired magnetization (usually saturation in one direction) and pulsing of the coil 48 to achieve the magnetization level required for control function should be shorter than the time required for the controlled element to react to any appreciable extent. The magnet 46 or its equivalent usually is driven to a saturated level of magnetization in one direction, as explained above, before the next control setting pulse resets the level of magnetization of the magnet. This permits a pulse of constant polarity to be used to set the level of magnetization required for the next successive time interval of control by the transducer 10 even though the degree of magnetization required in the magnet 46 is less than the level of magnetization required for the previous level of control of the associated actuator device.

If the actuator device is slow acting as compared to the time required to re-set the level of magnetism of the magnet 46, little or no adverse effect by the actuator device occurs. Damping of the beam of the transducer 10 and the inherent time required by the transducer to change its output permit the rapid resetting of the magnet 46 with negligible effect on the operation of the actuator (device 10) during the time needed to perform the re-set function. It is practical to reset the level of magnetization of the magnet 46 in milliseconds or even in microseconds because of the nature of the magnetic memory element using more sophisticated circuitry than is disclosed here for that purpose. Circuit means for more rapidly resetting the magnetization level will be apparent to those skilled in the art.

What is claimed is:

1. A method of setting to predetermined control levels individual control devices of a plurality of magnetically actuated control devices which each have a permanently magnetizable element including an electromagnetic coil which is magnetically coupled to a pivoted movable beam element whose movement is utilized in achieving the control function of the device, comprising sequentially determining for each device by means of external circuitry the degree of magnetization required for a requisite control function, pulsing the electromagnetic coil of each permanently magnetizable element by means of a single electrical pulse to a maximum degree of magnetization in one polarity and then pulsing said electromagnetic coil by means of a single electrical pulse in an opposite polarity to a predetermined level which drives each said magnetizable element to a level of permanent magnetization corresponding to the amount needed for providing the requisite control function for said device.

2. A method in accordance with claim 1, wherein said two pulsing steps for each device are performed in rapid succession.

3. A method in accordance with claim 1, wherein the magnetization resulting from both of said pulses is on the same side of the hysteresis curve of the magnetizable element.

4. A method in accordance with claim 1, wherein said control devices are force balance devices.

5. Control apparatus comprising a pneumatic force balance device having an output, a permanent magnetizable element including an associated electromagnetic coil and a balance beam in which the force exerted on said balance beam is utilized to control the output of said device, said magnetizable element being magnetically coupled to said balance beam, electrical means including a source of fixed voltage of one polarity for sequentially applying an electrical pulse of one polarity to said electromagnetic coil to drive said permanent magnetizable element to a base level of magnetism, and means including a variable voltage of a second polarity for applying a pulse of a second polarity to said electromagnetic coil to drive said permanent magnetizable element to a level of magnetism required to exert a wanted force on said beam to achieve a specified output from said device when said beam is balanced by a pneumatic force.

6. Apparatus in accordance with claim 5, wherein said balance beam has a permanent magnet mechanically coupled thereto and magnetically coupled to said magnetizable element.

7. Apparatus in accordance with claim 5, wherein said balance beam has a part mechanically coupled thereto which is made of magnetizable material.

8. Apparatus in accordance with claim 5, wherein said force actuating device is coupled to an apparatus actuating device.

9. Apparatus in accordance with claim 5, wherein a plurality of force balance devices are provided and means are provided for sequentially switching said two means for applying electrical pulses whereby each of said force balance devices are suitably pulsed in turn.

References Cited
UNITED STATES PATENTS

| | | | |
|---|---|---|---|
| 2,577,602 | 12/1951 | Burton | 317—157.5 X |
| 2,944,558 | 7/1960 | Dodge | 137—82 |
| 3,087,471 | 4/1963 | Ray | 137—82 X |
| 3,243,696 | 3/1966 | Lovell et al. | 317—157.5 X |

MILTON O. HIRSHFIELD, *Primary Examiner.*

LEE T. HIX, *Examiner.*